(12) United States Patent
Kyrberg et al.

(10) Patent No.: US 8,269,433 B2
(45) Date of Patent: Sep. 18, 2012

(54) CIRCUIT ARRANGEMENT AND METHOD FOR OPERATING A DISCHARGE LAMP

(75) Inventors: Karl Kyrberg, München (DE); Oskar Schallmoser, Ottobrunn (DE)

(73) Assignee: Osram AG, Munich (DE)

( * ) Notice: Subject to any disclaimer, the term of this patent is extended or adjusted under 35 U.S.C. 154(b) by 367 days.

(21) Appl. No.: 12/531,305

(22) PCT Filed: Mar. 12, 2007

(86) PCT No.: PCT/EP2007/052282
§ 371 (c)(1),
(2), (4) Date: Sep. 14, 2009

(87) PCT Pub. No.: WO2008/110204
PCT Pub. Date: Sep. 18, 2008

(65) Prior Publication Data
US 2010/0097005 A1    Apr. 22, 2010

(51) Int. Cl.
*G05F 1/00* (2006.01)
*H05B 37/02* (2006.01)
*H05B 39/04* (2006.01)
*H05B 41/36* (2006.01)

(52) U.S. Cl. ........ 315/311; 315/224; 315/279; 315/291; 315/307

(58) Field of Classification Search ........................ None
See application file for complete search history.

(56) References Cited

U.S. PATENT DOCUMENTS

| | | | | |
|---|---|---|---|---|
| 5,497,310 A | * | 3/1996 | Noda et al. | 363/17 |
| 2005/0179406 A1 | * | 8/2005 | Harada et al. | 315/291 |
| 2007/0164685 A1 | * | 7/2007 | Hase et al. | 315/274 |

FOREIGN PATENT DOCUMENTS

| | | |
|---|---|---|
| DE | 198 39 329 A1 | 3/2000 |
| DE | 100 11 484 A | 9/2001 |

* cited by examiner

*Primary Examiner* — Anh Tran
(74) *Attorney, Agent, or Firm* — Cozen O'Connor

(57) ABSTRACT

A circuit arrangement for operating a discharge lamp having a dielectric layer between at least one electrode and one discharge medium, comprising a primary circuit, which comprises a flux converter with at least one electronic switch, the flux converter having a first input terminal and a second input terminal for connecting an input voltage; a secondary circuit, which has a first output terminal and a second output terminal for connecting the discharge lamp; a transformer coupling the primary circuit to the secondary circuit, the transformer having at least a primary winding, a secondary winding and a transformer core, on which the primary winding and the secondary winding are wound; and a discrete inductance with a core, the discrete inductance being coupled electrically in parallel with the secondary winding.

11 Claims, 1 Drawing Sheet

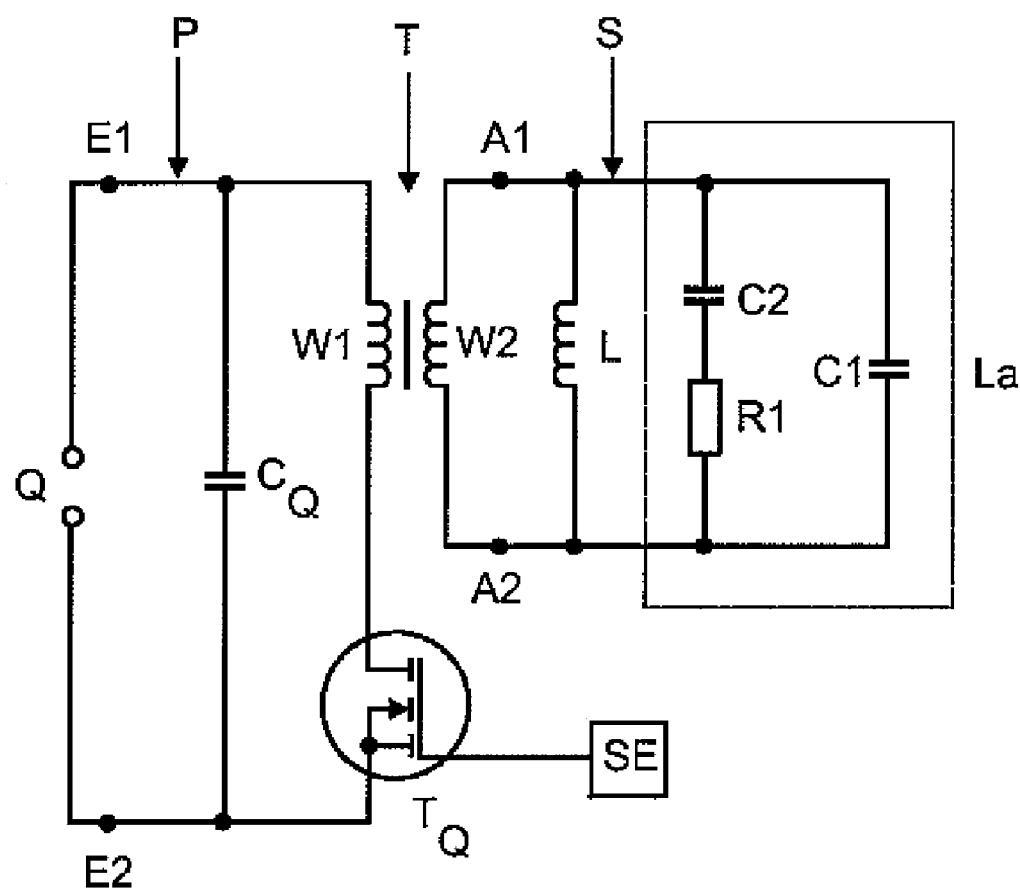

CIRCUIT ARRANGEMENT AND METHOD FOR OPERATING A DISCHARGE LAMP

RELATED APPLICATIONS

This is a U.S. national stage of application No. PCT/EP2007/052282, filed on Mar. 12, 2007.

FIELD OF THE INVENTION

The present invention relates to a circuit arrangement for operating a discharge lamp with a dielectric layer between at least one electrode and one discharge medium with a primary circuit, which comprises a flux converter with at least one electronic switch, the flux converter having a first input terminal and a second input terminal for connecting an input voltage, with a secondary circuit, which has a first output terminal and a second output terminal for connecting the discharge lamp, and with a transformer connecting the primary circuit to the secondary circuit, the transformer having at least a primary winding, a secondary winding and a transformer core, on which the primary winding and the secondary winding are wound. The invention moreover relates to a method for operating a discharge lamp with a dielectric layer between at least one electrode and one discharge medium using such a circuit arrangement.

BACKGROUND OF THE INVENTION

Such a circuit arrangement and such a method are known from DE 100 11 484 A1 and DE 198 39 329 A1. In the aforementioned prior art document it has already been indicated that a reduced physical volume and physical weight of such
a circuit arrangement is very desirable, with these sizes substantially being down to the transformer. Furthermore, the aforementioned application already mentions the problem of losses in the transformer core, which are expressed in terms of an undesirable heating of the transformer.

SUMMARY OF THE INVENTION

One object of the present invention is to provide a circuit arrangement of the type described above or a method of the type described above in such a way that a reduction in the power loss is made possible with a small physical volume and physical weight.

This and other objects are attained in accordance with one aspect of the present invention directed to a circuit arrangement for operating a discharge lamp with a dielectric layer between at least one electrode and one discharge medium, comprising a primary circuit, which comprises a flux converter with at least one electronic switch, the flux converter having a first input terminal and a second input terminal for connecting an input voltage; a secondary circuit, which has a first output terminal and a second output terminal for connecting the discharge lamp; a transformer coupling the primary circuit to the secondary circuit, the transformer having at least a primary winding, a secondary winding and a transformer core, on which the primary winding and the secondary winding are wound; and a discrete inductance with a core, the discrete inductance being coupled electrically in parallel with the secondary winding.

Another aspect of the present invention is directed to a method for operating a discharge lamp with a dielectric layer between at least one electrode and one discharge medium using a circuit arrangement comprising a primary circuit, which comprises a flux converter at least one electronic switch, the flux converter having a first input terminal and a second input terminal for connecting an input voltage, with a secondary circuit, which has a first output terminal and a second output terminal for connecting the discharge lamp, and a transformer coupling the primary circuit to the secondary circuit, the transformer having at least a primary winding, a secondary winding and a transformer core, on which the primary winding and the secondary winding are wound; wherein the method comprises the steps of: closing the at least one electronic switch of the flux converter for generating a change in voltage across the secondary winding of the transformer and; a discrete inductance, which is coupled electrically in parallel with the secondary winding, entering saturation without the transformer entering saturation.

The present invention takes into account the knowledge that the losses converted into heat in the prior art substantially originate from the saturation of the transformer. Lower losses could then be achieved if a core material with a steeper hysteresis curve were to be selected. Such a material is expensive, however, with the result that directly replacing the existing transformer core with a core made from a material with a steeper hysteresis curve is not an option. The invention takes the approach of arranging a discrete inductance with a core in parallel with the secondary winding. Since it is not necessary for two DC-isolated windings, as in the case of the transformer, to be wound on the core of this discrete inductance, a reduced insulation of the windings on the core of this discrete inductance is made possible. In particular, in the case of an inductance with a given core size, more copper volume can be applied than in the case of a transformer. As a result, the same voltage-time integral as with the transformer can be achieved by a smaller core volume. As a result, it is only the core of the discrete inductance that needs to be formed from a high-quality material with a steep hysteresis curve, while the transformer core can be formed from a more favorable core material with a flatter hysteresis curve. A core material with a steep hysteresis curve not only results in a smaller area of the hysteresis loop, which results in lower core losses, but also makes it possible to change the inductance from the mH range to the μH range much more quickly. As a result, quicker charge reversal of the discharge lamp and therefore increased efficiency of the discharge lamp can be achieved.

Particularly preferably, the voltage-time integral at which the discrete inductance enters saturation is smaller than the voltage-time integral at which the transformer enters saturation owing to the voltage at the secondary winding. This measure ensures that the core of the transformer, which is preferably manufactured from a material which is less expensive than that of the inductance core, does not enter saturation. The core of the inductance enters saturation, but is manufactured from a higher-quality core material with a steep hysteresis curve, with the result that, overall, the losses are reduced in comparison with the prior art.

Preferably, the transformer and the discrete inductance are dimensioned in such a way that, once the at least one electronic switch of the flux converter has closed, the discrete inductance prevents saturation of the transformer at least for a predeterminable voltage-time integral of the voltage across the secondary winding. Given a suitable design of this predeterminable voltage-time integral, it can be ensured that the core of the transformer does not saturate during normal operation, but instead only the core of the discrete inductance enters saturation.

Preferably, the transformer and the discrete inductance are dimensioned in such a way that, once the at least one electronic switch of the flux converter has closed and after a predeterminable voltage-time integral of the voltage across the secondary winding, the discrete inductance enters saturation, while the transformer does not enter saturation. This also ensures that, given a corresponding design of the predeterminable voltage-time integral, the transformer core does not saturate during normal operation.

Further preferably, the first output terminal and the second output terminal are arranged between the secondary winding and the discrete inductance, the discharge lamp and the discrete inductance being formed in a unit which can be connected to the first output terminal and the second output terminal. As a result, EMC interference can be markedly reduced. This is based on the knowledge that a large proportion of the disruptive radiofrequency signals occur between the discrete inductance and the lamp. If the distance between the discrete inductance and the lamp is therefore shortened, the EMC interference can be reduced.

Preferably, the at least one electronic switch of the flux converter is designed for an operating frequency of between 20 and 100 kHz. The discrete inductance, unsaturated, is preferably between 1 and 400 mH, in particular 100 mH. The discrete inductance, in saturation, is preferably between 5 and 100 µH, in particular 50 µH. Further preferably, the transformation ratio of the transformer is between 2 and 100, in particular 7.

In a preferred exemplary embodiment, the circuit arrangement furthermore comprises the discharge lamp, it being possible for the discharge lamp to be described by a parallel circuit comprising a first capacitance and a series circuit, with the series circuit comprising a second capacitance and a nonreactive resistance, the characteristic frequency $$f = \frac{1}{(2*\pi\sqrt{(LC_2)})}$$

being lower than 10 kHz, where L represents the unsaturated discrete inductance, and $C_2$ represents the second capacitance.

Finally, with a view to reducing costs, the core of the discrete inductance is preferably manufactured from a material with a steeper hysteresis curve than the core of the transformer.

The preferred embodiments proposed with reference to the circuit arrangement according to the invention and the advantages thereof apply, if appropriate, correspondingly to the method according to the invention.

BRIEF DESCRIPTION OF THE SINGLE DRAWING

The drawing shows a schematic illustration of an exemplary embodiment of a circuit arrangement according to the invention.

DETAILED DESCRIPTION OF THE SINGLE DRAWING

The drawing shows a schematic illustration of an exemplary embodiment of a circuit arrangement according to the invention. In said FIGURE, first, La represents a discharge lamp which is designed for dielectric barrier discharges and can be described using an equivalent circuit diagram by a capacitor $C_1$, which is connected in parallel with a series circuit comprising a capacitor $C_2$ and a nonreactive resistor $R_1$. The discharge lamp La is connected into a secondary circuit S, which, in addition to the discharge lamp La, contains a secondary winding W2 of a transformer T and a discrete inductance L connected in parallel therewith. Moreover, a first output terminal A1 and a second output terminal A2 are provided. The primary winding W1 of the transformer T is in a primary circuit P, which is supplied with power for the transformer T, the inductance L and the discharge lamp La from a power supply Q. The power supply Q is coupled to the primary circuit via a first input terminal E1 and a second input terminal E2.

In addition, there is a quick-response switch $T_Q$ in one of the branches between the power source Q and the primary winding W1. This quick-response switch is a power MOSFET, which is switched or controlled by a control device SE.

There is a storage capacitor $C_Q$ in parallel with the series circuit comprising the primary winding W1 and the switch $T_Q$. This storage capacitor $C_Q$ is recharged from the source Q, belongs in principle to the source Q and is used for applying a voltage to the primary winding W1 depending on the switching state of the switch $T_Q$. Ceramic multilayered capacitors are preferably used for this purpose. The primary winding W1 and the switch $T_Q$ form a flux converter, in which, first, a current flow through the primary winding W1 is conventionally produced, with the turns ratio of the transformer T being designed in such a way that the current flow through the primary winding W1 induces a starting voltage in the secondary winding W2 and therefore indirectly across the discharge lamp La. If the switch $T_Q$ is opened by the control device SE, energy remains in the secondary circuit S, at least in the form of remanence of the transformer T and the inductance L.

The drawing shows directly that complete DC isolation is present between the primary circuit P and the secondary circuit S. This is of considerable advantage in terms of safety in respect of the high voltages present on the secondary circuit side S.

In the embodiment of a circuit arrangement according to the invention illustrated in the drawing, the core of the discrete inductance L is manufactured from a material with a steeper hysteresis curve than the core of the transformer T. Moreover, the voltage-time integral at which the discrete inductance L enters saturation is smaller than the voltage-time integral at which the transformer T enters saturation owing to the voltage across the secondary winding W2. Once the switch $T_Q$ of the flux converter has closed, the discrete inductance L therefore prevents saturation of the transformer T, at least for a predeterminable voltage-time integral of the voltage across the secondary winding W2. In particular, this means that although the discrete inductance L enters saturation, the transformer T does not.

If L represents the unsaturated discrete inductance, a characteristic frequency f can be calculated by $$f = \frac{1}{(2*\pi\sqrt{(LC_2)})}$$

In this case, suitable dimensioning ensures that the frequency f is less than 10 kHz. This equation can therefore be used to obtain a relationship for the order of magnitude of the discrete inductance L, depending on the capacitance $C_2$ in the equivalent circuit diagram for the discharge lamp La.

Although the drawing illustrates a specific embodiment of a flux converter, the present invention can easily be realized using other flux converters.

Preferably, the discrete inductance L and the discharge lamp La are formed as a unit, with the result that the distance between the inductance L and the discharge lamp La can be designed to be as small as possible.

In a preferred exemplary embodiment, the core of the inductance L is formed from Vitroperm by the company Vacuumschmelze, specifically as a toroidal core with an outer diameter of 40 mm, an inner diameter of 32 mm, a height of 15 mm and 81 turns. The discharge lamp La had an area of 0.28 m² in the exemplary embodiment. The core of the transformer T comprised a favorable ferrite material.

The scope of protection of the invention is not limited to the examples given hereinabove. The invention is embodied in each novel characteristic and each combination of characteristics, which includes every combination of any features which are stated in the claims, even if this feature or combination of features is not explicitly stated in the examples.

The invention claimed is:

1. A circuit arrangement for operating a discharge lamp with a dielectric layer between at least one electrode and one discharge medium, comprising:
    a primary circuit, which comprises a flux converter with at least one electronic switch, the flux converter having a first input terminal and a second input terminal for connecting an input voltage;
    a secondary circuit, which has a first output terminal and a second output terminal for connecting the discharge lamp;
    a transformer coupling the primary circuit to the secondary circuit, the transformer having at least a primary winding, a secondary winding and a transformer core, on which the primary winding and the secondary winding are wound;
    a discrete inductance with a core, the discrete inductance being coupled electrically in parallel with the secondary winding; and
    the discharge lamp;
    wherein the discharge lamp corresponds to a parallel circuit comprising a first capacitance and a series circuit, with the series circuit comprising a second capacitance and a nonreactive resistance, the characteristic frequency $$f = \frac{1}{(2*\pi\sqrt{(LC_2)})}$$

being lower than 10 kHz, where L represents an unsaturated discrete inductance, and C2 represents the second capacitance.

2. The circuit arrangement as claimed in claim 1, wherein the voltage-time integral at which the discrete inductance enters saturation is smaller than the voltage-time integral at which the transformer enters saturation owing to the voltage at the secondary winding.

3. The circuit arrangement as claimed in claim 1, wherein the transformer and the discrete inductance are dimensioned such that, once the at least one electronic switch of the flux converter has closed, the discrete inductance prevents saturation of the transformer at least for a predeterminable voltage-time integral of the voltage across the secondary winding.

4. The circuit arrangement as claimed in claim 3, wherein the transformer and the discrete inductance are dimensioned such that, once the at least one electronic switch of the flux converter has closed and after a predeterminable voltage-time integral of the voltage across the secondary winding, the discrete inductance enters saturation, while the transformer does not enter saturation.

5. The circuit arrangement as claimed in claim 1, wherein the first output terminal and the second output terminal are arranged between the secondary winding and the discrete inductance, the discharge lamp and the discrete inductance being formed in a unit which can be connected to the first output terminal and the second output terminal.

6. The circuit arrangement as claimed in claim 1, wherein the at least one electronic switch of the flux converter is configured to operate at a frequency of between 20 and 100 kHz.

7. The circuit arrangement as claimed in claim 1, wherein the discrete inductance, unsaturated, is between 1 and 400 mH.

8. The circuit arrangement as claimed in claim 1, wherein the discrete inductance, in saturation, is between 5 and 100 pH.

9. The circuit arrangement as claimed in claim 1, wherein the transformation ratio of the transformer is between 2 and 100.

10. The circuit arrangement as claimed in claim 1, wherein the core of the discrete inductance is manufactured from a material with steeper hysteresis than the core of the transformer.

11. A method for operating a discharge lamp having a dielectric layer between at least one electrode and one discharge medium using a circuit arrangement comprising a primary circuit, which comprises a flux converter at least one electronic switch, the flux converter having a first input terminal and a second input terminal for connecting an input voltage, a secondary circuit, which has a first output terminal and a second output terminal for connecting the discharge lamp, and a transformer coupling the primary circuit to the secondary circuit, the transformer having at least a primary winding, a secondary winding and a transformer core, on which the primary winding and the secondary winding are wound, the method comprising the steps of:
    a) closing the at least one electronic switch of the flux converter for generating a change in voltage across the secondary winding of the transformer; and
    b) a discrete inductance, which is coupled electrically in parallel with the secondary winding, entering saturation without the transformer entering saturation;
        wherein the discharge lamp corresponds to a parallel circuit comprising a first capacitance and a series circuit, with the series circuit comprising a second capacitance and a nonreactive resistance, the characteristic frequency $$f = \frac{1}{(2*\pi\sqrt{(LC_2)})}$$

being lower than 10 kHz, where L represents an unsaturated discrete inductance, and C2 represents the second capacitance.

* * * * *